United States Patent Office 3,796,767
Patented Mar. 12, 1974

3,796,767
PROCESS FOR PREPARING DIOLEFINS
John G. McNulty and William L. Walsh, Glenshaw, Pa., assignors to Gulf Research & Development Company, Pittsburgh, Pa.
No Drawing. Filed Apr. 19, 1973, Ser. No. 352,534
Int. Cl. C07c 1/30
U.S. Cl. 260—680 R     9 Claims

ABSTRACT OF THE DISCLOSURE

A process for converting 2,3-dibromo-2-methylbutane or 2,3-dibromo-2,3-dimethylbutane to isoprene or 2,3-dimethylbutadiene, respectively, which involves heating a mixture of 2,3-dibromo-2-methylbutane or 2,3-dibromo-2,3-dimethylbutane and steam at elevated temperatures.

---

This invention relates to a process for converting 2,3-dibromo-2-methylbutane to isoprene and 2,3-dibromo-2,3-dimethylbutane to 2,3-dimethylbutadiene.

In U.S. Pat. No. 1,198,943 to Matthews et al. steam is passed through liquid mixed dichlorides obtained by the chlorination of isoamyl chloride, but a small amount of isoprene is obtained. A mixture of the same dichlorides and water are subjected to boiling, but no results are given. Heating the same mixture in a sealed tube is said to result in a considerable amount of polymer. Finally, Matthews et al. flows water and 2,3-dichlorobutane into a vessel which is maintained at about 600° to about 700° C., but gives no results therefor, and states that the vapor of the dichloride can be passed through a heated tube together with steam.

We have found that if a 2,3-dibromomethylbutane is passed through a reaction zone in vapor form together with steam at an elevated temperature for a short period of time substantially all of the charge is converted to a product consisting essentially of the desired corresponding diolefin, in sharp contrast to the results obtained when similar $C_4$ dihaloalkanes and 1,3-dichloro-1-methylbutane are subjected to the same treatment.

The charge will consist of either 2,3-dibromo-2-methylbutane or 2,3-dibromo-2,3-dimethylbutane and steam, with each being in vapor form. The charge, water and the 2,3-dibromomethylbutane, in liquid form prior to vaporization, must be in the volume range of about 1.5:1 to about 5:1, preferably in the range of about 2:1 to about 3:1.

In operation the charge in vapor form is passed either upwardly or downwardly through a reactor maintained in a temperature range of about 400° to about 525° C., preferably in the range of about 440° to about 500° C., at a pressure as high as about 50 pounds per square inch gauge (3.52 kilograms per square centimeter), or even higher, but preferably atmospheric, for about two to about 20 seconds, preferably for about five to about 10 seconds. The reactor is preferably empty, although inert packing, such as glass beads, glass Raschig rings, quartz chips, beryl saddles, etc., can be present.

The recovery of the desired isoprene or 2,3-dimethylbutadiene can be effected in any convenient manner. For example, the vapors as they leave the reaction zone, are passed through a condenser, wherein at a suitable temperature, for example, within the range of about 10° to about 20° C., condensation occurs. The liquid product so obtained resolves itself into two liquid phases, a lower aqueous phase containing HBr dissolved therein and an upper hydrocarbon phase. Simple decantation is sufficient to effect separation of the two phases.

When 2,3-dibromo-2-methylbutane is employed as charge, the hydrocarbon phase will contain the desired isoprene and small amounts of unconverted charge, undesired isopentene, isopentane and even smaller amounts of polymer. Distillation of the hydrocarbon phase at atmospheric pressure will result in the removal of converted charge, which consists of isopentane at 27° C. and at 34° C. of an azeotrope containing about three parts of isoprene and one part of isopentene, leaving behind substantially all of the isoprene formed, unconverted charge and a small amount of polymer. Further distillation at 34.2° C. will result in the recovery of the desired isoprene.

When 2,3-dibromo-2,3-dimethylbutane is the charge, the hydrocarbon phase will contain the desired 2,3-dimethylbutadiene and small amounts of unconverted charge, undesired 2,3-dimethylbutene-2,2,3-dimethylbutane and even smaller amounts of polymer. Distillation of the hydrocarbon phase at atmospheric pressure will result in the removal therefrom of converted charge, which consists of 2,3-dimethylbutane at 58° C., and an azeotrope containing about equal amounts of 2,3-dimethylbutene-2 and 2,3-dimethylbutadiene at 68.5° C., leaving behind substantially all of the 2,3-dimethylbutadiene formed, unconverted charge and a small amount of polymer. Further distillation at 68.9° C. will result in the recovery of the desired 2,3-dimethylbutadiene.

That the process defined and claimed herein is unique to the treatment of a 2,3-dibromomethylbutane is apparent from the following series of runs. Water and $C_4$ or $C_5$ alkyldibromide in a selected volume ratio were charged to a vaporizer that was maintained at atmospheric pressure and a temperature of 213° C. and then passed downwardly through a reactor tube having a length of 48 centimeters and a diameter of 2.34 centimeters, either empty or packed with glass Raschig rings for a contact time of about five seconds. In the latter case, the Raschig rings occupied about 37 volume percent of the reactor space. The reactor was maintained at atmospheric pressure and a temperature of 450° C. The heavier liquid products were collected in a cold water receiver, while the lighter products were collected in Dry Ice traps. Recovery of product in each instance was better than 97 weight percent. Conversions were determined by titrating the acidity of the water phase. Selectivities were determined by gas liquid chromatography of the gaseous and liquid products. The results are shown below in Table I.

TABLE I

| Run No. | Charge | Volume ratio of water to charge prior to vaporization | Type of reactor | Mol percent conversion | Weight percent butadiene or isoprene in product |
|---|---|---|---|---|---|
| 1 | 2,3-dichlorobutane | 2.8 | Empty | 1.3 | Nil |
| 2 | do | 1.8 | Filled | 1.0 | Nil |
| 3 | 1,3-dibromobutane | 2.1 | Empty | 36.5 | 97.7 |
| 4 | do | 2.0 | Filled | 25.0 | 96.4 |
| 5 | 1,3-dichloro-1-methylbutane | 2.0 | Empty | 30.6 | 99.0 |
| 6 | do | 2.1 | Filled | 30.9 | 99.0 |
| 7 | 2,3-dibromo-2-methylbutane | 2.1 | Empty | 91.2 | 97.9 |
| 8 | do | 2.0 | Filled | 88.0 | 97.5 |

The results obtained above are unusual and unexpected. The treatment of a $C_4$ dihalide in accordance with the process defined and claimed herein does not appear to be promising. Conversions obtained with the $C_4$ dichloro compound are exceedingly slight and while the weight percent butadiene obtained using the $C_4$ dibromo compound are excellent, conversions are small and a large amount of recycle would be required to make the process feasible. The treatment of the $C_5$ dichloro compound is similarly ineffective. However, attention is directed to Runs Nos. 7 and 8 wherein 2,3-dibromo-2-methylbutane was subjected to the procedures defined herein. Substantially all of the charge was converted to a product consisting almost solely of isoprene. In the preferred embodiment, Run No. 7, using an empty reactor, a slightly higher conversion was obtained.

Obviously, many modifications and variations of the invention, as hereinabove set forth, can be made without departing from the spirit and scope thereof and, therefore, only such limitations should be imposed as are indicated in the appended claims.

We claim:

1. A process for converting the alkyl dibromide 2,3-dibromo-2-methylbutane to isoprene or 2,3-dibromo-2,3-dimethylbutane to 2,3-dimethylbutadiene which comprises subjecting a mixture containing steam and 2,3-dibromo-2-methylbutane or 2,3-dibromo-2,3-dimethylbutane to a temperature of about 400° to about 525° C. for about two to about 20 seconds.

2. The process of claim 1 wherein the temperature is in the range of about 440° to about 500° C.

3. The process of claim 1 wherein the heating time is about two to about 10 seconds.

4. The process of claim 1 wherein the alkyl bromide is 2,3-dibromo-2-methylbutane.

5. The process of claim 1 wherein the alkyl bromide is 2,3-dibromo-2,3-dimethylbutane.

6. The process of claim 1 wherein the mixture prior to vaporization consists of water and the dialkylbromide in a volume ratio of about 1.5:1 to about 5:1.

7. The process of claim 1 wherein the mixture prior to vaporization consists of water and the dialkylbromide in a volume ratio of about 2:1 to about 3:1.

8. The process of claim 1 wherein the reaction is carried out in an empty reactor.

9. The process of claim 1 wherein the reaction is carried out in a reactor containing inert packing.

References Cited

UNITED STATES PATENTS

| | | | |
|---|---|---|---|
| 1,026,418 | 5/1912 | Webel | 260—680 XA |
| 1,198,943 | 9/1916 | Mathews et al. | 260—680 XA |
| 2,310,523 | 2/1943 | Groll et al. | 260—680 XA |
| 3,676,518 | 7/1972 | Hoppstock et al. | 260—680 R |

PAUL M. COUGHLAN, JR., Primary Examiner

U.S. Cl. X.R.

260—680 XA